United States Patent [19]

Ronda et al.

[11] Patent Number: 5,387,436
[45] Date of Patent: Feb. 7, 1995

[54] METHOD OF COATING RED-LUMINESCING PHOSPHOR PARTICLES WITH HEMATITE

[75] Inventors: Cornelis Ronda, Aachen; Guido Hütten, Aachen-Walheim; Michael Bredol, Aachen; Ulrich Kynast, Roetgen; Thomas Rink, Zettnigen, all of Germany

[73] Assignee: U.S. Philips Corporation, New York, N.Y.

[21] Appl. No.: 153,381

[22] Filed: Nov. 16, 1993

[30] Foreign Application Priority Data

Nov. 26, 1992 [DE] Germany ............................. 4239747

[51] Int. Cl.⁶ .............................................. B05D 7/00
[52] U.S. Cl. ...................................... 427/215; 427/64; 427/68; 427/157
[58] Field of Search ................... 427/64, 68, 157, 215

[56] References Cited

U.S. PATENT DOCUMENTS 4,297,390 10/1981 Franz et al. ........................... 427/64
5,213,894 5/1993 Kim ..................................... 427/68

FOREIGN PATENT DOCUMENTS 5554382 4/1980 Japan.

Primary Examiner—Shrive Beck
Assistant Examiner—David M. Maiorana
Attorney, Agent, or Firm—Ernestine C. Bartlett

[57] ABSTRACT

The invention relates to a method of coating red-luminescing phosphor particles with hematite ($\alpha$—$Fe_2O_3$), whereby first $Fe(OH)_3$ is deposited on the phosphor particles and subsequently converted into $\alpha$—$Fe_2O_3$ at a raised temperature. A good adhesion of the hematite pigments to the phosphor particles is achieved in that first an aqueous solution of an iron(III) salt and a complexing agent is prepared, in which the complexing agent and its concentration are so chosen that in combination with $Fe^{3+}$ ions complex ions are formed which on the one hand do not yet precipitate at a pH-value which is at least 0.5 higher than the value at which the phosphor particles just fail to be chemically attacked anymore, and which are dissociable at a further increase in the pH-value so that $Fe(OH)_3$ is formed, in that subsequently, if the pH-value is not yet high enough, a basic substance is added to the mixture, in that the pH-value is increased to a value which is at least 0.5 below the value at which $Fe(OH)_3$ starts to precipitate and at least 0.5 higher than the value at which the phosphor particles just fail to be chemically attacked anymore, in that subsequently the phosphor particles are added while stirring, in that at any moment, as required, a substance is added which dissociates upon an increase in temperature and which behaves as a base upon dissociation, and in that then the temperature of the suspension is slowly increased, whereby the phosphor particles are coated with $Fe(OH)_3$ through homogeneous precipitation.

17 Claims, No Drawings

METHOD OF COATING RED-LUMINESCING PHOSPHOR PARTICLES WITH HEMATITE

BACKGROUND OF THE INVENTION

The invention relates to a method of coating red-luminescing phosphor particles with hematite ($\alpha$—$Fe_2O_3$), whereby first $Fe(OH)_3$ is deposited on the phosphor particles and is subsequently convened into $\alpha$—$Fe_2O_3$ at a raised temperature. Such a method is known from JP 55-54 382(A) (English Abstract).

SUMMARY OF THE INVENTION

The invention has for its object to provide a method of the kind mentioned in the opening paragraph which provides a good adhesion of the hematite pigment to the phosphor particles and a good contrast effect on a picture screen. An additional object of the invention is to provide such a method in which the generation of poisonous or carcinoginous substances is be avoided to a high degree during the implementation of the method.

These objects are achieved in that first an aqueous solution of an iron(III) salt and a complexing agent is prepared, in which the complexing agent and its concentration are so chosen that in combination with $Fe^{3+}$ ions complex ions are formed which on the one hand do not yet precipitate at a pH-value which is at least 0.5 higher than the value at which the phosphor particles just fail to be chemically attacked anymore, and which are dissociable at a further increase in the pH-value to form $Fe(OH)_3$ in that subsequently, if the pH-value is not yet high enough, a basic substance is added to the mixture, so that the pH-value is increased to a value which is at least 0.5 below the value at which $Fe(OH)_3$ starts to precipitate and is at least 0.5 higher than the value at which the phosphor particles just fail to be chemically attacked anymore, in that subsequently the phosphor particles are added while stirring, in that at any moment, as required, a substance is added which dissociates upon an increase in temperature and which behaves as a base upon dissociation, and in that then the temperature of the suspension is slowly increased, whereby the phosphor particles are coated with $Fe(OH)_3$ through homogeneous precipitation.

According to the invention, the hematite pigment is provided on the phosphor particles through homogeneous precipitation. Particularly small pigment particles are created thereby, which have an excellent adhesion.

Stoichiometric solutions of iron(III) salts in water are in general thermodynamically unstable with the precipitation of solid $Fe(OH)_3$. The acidity effect resulting from hydroxo complex formation of the $Fe^{3+}$ ion alone is not sufficient to stabilize the solutions; if the solution is to be free from solid $Fe(OH)_3$, accordingly, the acid conjugated. However, with; the anion should also be added. With or without acid addition, the Fe(III) salt solutions are so strongly acidic that phosphors comprising sulphur, such as in particular $Y_2O_2S$:Eu, are attacked. The phosphor particles are at least partly dissolved. Their surfaces are degraded, so that in particular the luminescent efficacy is reduced.

It is indeed possible to increase the pH-value through the addition of basic substances to such an extent that the phosphors are no longer attacked. Then, however, $Fe(OH)_3$ would precipitate prematurely and in an uncontrolled manner. This is avoided, according to the invention, in that a substance is added to the acidic Fe(III) salt solution a substance is added which in competition with $OH^-$ ions supplies different complexing ions of similar affinity which form complex ions together with $Fe^{3+}$ ions which do not yet lead to the generation of solid $Fe(OH)_3$, also at higher pH-values which are harmless to the phosphor particles. Suitable complexing ions are, for example, fluoride, acetyl acetonate, and in particular oxalate. As a result of this, the pH-value of the solution, if it has not yet exceeded the critical value for etching of the phosphor particles, can be increased through addition of a base (for example, $NH_4OH$, NaOH, KOH) to a sufficient value which, however, must be so low that $Fe(OH)_3$ is not yet precipitated. Only then, when the equilibrium state has been reached, may the phosphor particles be stirred into the solution. When the pH-value is further increased, $Fe(OH)_3$ is formed and deposited on the phosphor particles through homogeneous precipitation.

The required slow and homogeneous increase in the pH-value is effected through a gradual temperature increase. If no substances of basic character are generated during this in any case, or the stability of the Fe(III) ions does not decrease of its own accord, it is possible to add a substance beforehand which dissociates under the influence of heat and becomes increasingly basic.

Subject to the nature of the selected complexing agent, the quantity thereof must be so adapted that the boundary conditions set in accordance with the invention are satisfied. The required quantity may also be determined through calculation in known manner, provided the stability constants of the substances present in the solution are known.

Since $Fe(OH)_3$ would also be deposited on pollutant particles which act as nuclei, it is advantageous that the solution containing the iron(III) salt, the complexing agent, the basic substance and, if present, the substance which dissociates upon an increase in temperature is filtered through a very free filter.

DETEAILED DESCRIPTION OF THE INVENTION

Two alternative embodiments of the invention are explained in more detail below.

$Fe(NO_3)_3.9H_2O$, oxalic acid dihydrate and urea were dissolved in water. The molar ratio of oxalic acid dihydrate to Fe was varied from 1 to 8, while urea was added in excess quantity each time, advantageously in a molar ratio of urea to Fe of approximately 200. The urea quantity is not critical because only the portion actually hydrolysed subsequently in the thermal dissociation takes pan in the reaction.

$Fe^{3+}$ ions and $OH^-$ ions in the solution can react to form the complex ions $Fe(OH)^{2+}$, $Fe(OH)_2^+$ and $Fe(OH)_3$ (aq). $Fe^{3+}$ ions and oxalate ions $ox^{2-}$ react to form the complex ions $Feox^+$, $Fe(ox)^-_2$ and $Fe(ox)_3^{3-}$. The higher the molar ratio of oxalic acid dihydrate to Fe is chosen to be, the lower the ratio of hydroxo complex ions to oxalate complex ions. It can accordingly be achieved, by taking a sufficiently large quantity of oxalic acid, that substantially all $Fe^{3+}$ ions are masked as oxalate complex ions.

The molar ratio of oxalic acid dihydrate to Fe must be chosen to be higher in proportion as a phosphor to be coated is more sensitive to acid attach. For ratios between 1 and 2, the pH-value could subsequently be raised to between 2.8 and 3.7 without $Fe(OH)_3$ being precipitated already. In the case of particularly sensitive phosphors, however, molar ratios of >3 are necessary. A ratio of between approximately 2 and 8 was found to be advantageous for $Y_2O_2S$:Eu. A molar ratio of 4 was chosen for the present embodiment. Then the pH-value of the solution was raised from 2 to approximately 4.5 through addition of $NH_4OH$. Then $Y_2O_2S$:Eu was added. Under the conditions as indicated here, the precipitation of $Fe(OH)_3$ takes place substantially quantitatively, so that the ratio of the Fe(III) quantity to the $Y_2O_2S$:Eu quantity to be set can be calculated directly from the desired $Fe_2O_3$ layer thickness and the particle morphology of the phosphor. The urea was dissociated through heating and stirring at approximately 70°–90° C. Ammonium carbonate $(NH_4)_2CO_3$ was generated thereby, which reacts as a weak base. $Fe(OH)_3$ started precipitating from a pH-value of approximately 5. The reaction was stopped at pH 7.5. The coated phosphor particles were separated through filtration and heated to approximately 350° for converting $Fe(OH)_3$ into $\alpha$—$Fe_2O_3$.

Color picture robes were manufactured with phosphor particles pigmented in this manner, which tubes showed a particularly high contrast. The pigment layers were not damaged during the necessary processing steps.

Masking of the $Fe^{3+}$ is similarly successful when the following alternative embodiment of the method is used (the use of fluoride and thermally unstable complex ions): 1.7 g $Fe(NO_3)_3.9H_2O$, 2 g $NH_4Cl$, and 1.55 g $NH_4F$ were dissolved in 100 ml $H_2O$ and filtered through a 200 nm filter. The pH-value of this solution was 5.5, i.e. sufficiently high for $Y_2O_2S$:Eu not to be susceptible to etching attach. 11.2 g $Y_2O_2S$:Eu was added to this solution. While the temperature was slowly increased, the generated $(FeF_6)^{3-}$ ions were dissociated, so that $Fe(OH)_3$ precipitated. The phosphor particles coated with $Fe(OH)_3$ were again separated through filtration. If pure $\alpha$—$Fe_2O_3$ (hematite) is desired, however, the method with oxalic acid is to be preferred.

We claim:

1. A method of coating red-luminescing phosphor particles, subject to chemical attack by acidic non-complexed iron (III) salts, with hematite ($\alpha Fe_2O_3$) while preventing attack of said particles by acidic non-complexed iron (III) salts, said method comprising combining an iron (III) salt, a complexing agent for said salt and water, said complexing agent and the concentration thereof are chosen so that complex ions are formed with $Fe^{3+}$ ions, which complex ions do not start to precipitate at a first pH-value which is at least 0.5 higher than the value at which said phosphor particles just fail to be chemically attacked by acidic non-complexed iron (III) salts and which complex ions are dissociable to form $Fe(OH)_3$ at a higher pH value, adjusting the pH of said resultant solution to said first value, adding a substance to said solution, which substance dissociates upon heating to form a base, in an amount sufficient to provide a sufficient amount of said base to increase the pH of said solution to a value at which said complex ions just start to dissociate so as to precipitate $Fe(OH)_3$, adding said phosphor particles to the resultant solution and increasing the temperature of the resultant phosphor particle containing suspension at a rate whereby said substance forms said base at a rate such that the rate of increase of the pH of said phosphor particle containing suspension and of the resultant precipitation of $Fe(OH)_3$ results in the formation of a homogeneous coating of $Fe(OH)_3$ on said phosphor particles, separating said coated phosphor particles from said suspension and heating said particles to convert said $Fe(OH)_3$ to hematite ($\alpha Fe_2O_3$).

2. A method as claimed in claim 1, characterized in that $Y_2O_2S$:Eu phosphor particles are used.

3. A method as claimed in claim 1 characterized in that urea is used as the substance which forms a base upon thermal dissociation.

4. A method as claimed in claim 1, characterized in that oxalic acid is used as the complexing agent.

5. A method as claimed in claim 1, characterized in that fluoride ions are used as the complexing agents.

6. A method as claimed in claim 1, characterized in that the solution containing the iron(HI) salt, the complexing agent, the basic substance and, if present, the substance which dissociates upon an increase in temperature is filtered.

7. A method as claimed in claim 1, characterized in that the following are dissolved in water: 1.7 to 17 g/l $Fe(NO_3)_3.9H_2O$, 0 to 20 g/l $NH_4Cl$, 1.55 to 15.5 g/l $NH_4F$, in that, after filtering the resultant solution, approximately 112 g/l $Y_2O_2S$:Eu is added to this solution while stirring, and in that then the resulting suspension is heated.

8. A method as claimed in claim 2, characterized in that urea is used as the substance which forms a base upon thermal dissociation.

9. A method as claimed in claim 2, characterized in that oxalic acid is used as the complexing agent.

10. A method as claimed in claim 3, characterized in that oxalic acid is used as the complexing agent.

11. A method as claimed in claim 2, characterized in that fluoride ions are used as the complexing agents.

12. A method as claimed in claim 3, characterized in that fluoride ions are used as the complexing agents.

13. A method as claimed in claim 2, characterized in that the solution containing the iron(III) salt, the complexing agent, the basic substance and, if present, the substance which dissociates upon an increase in temperature is filtered.

14. A method as claimed in claim 3, characterized in that the solution containing the iron(III) salt, the complexing agent, the basic substance and, if present, the substance which dissociates upon an increase in temperature is filtered.

15. A method as claimed in claim 4, characterized in that the solution containing the iron(III) salt, the complexing agent, the basic substance and, if present, the substance which dissociates upon an increase in temperature is filtered.

16. The method of claim 1, wherein the phosphor is $Y_2O_2S$:Eu and an Fe (III) salt, oxalic acid dihydrate in a molar ratio of the oxalic acid dehydrate to Fe in excess of 1:1 and urea in an excess quantity are dissolved in water, after the resultant solution reaches equilibrium $NH_4OH$ is added in an amount so as to increase the pH of said solution to approximately 4.5, $Y_2O_2S$:Eu is added to said solution and the resultant is heated to 70°–90° C. until the pH of said suspension is approximately 7.5.

17. The method of claim 16, wherein the Fe (III) salt is $Fe(NO_3)_3$, the molar ratio of the oxalic acid dehydrate to Fe is approximately 4:1 and the molar ratio of urea to Fe is approximately 200:1.

* * * * *